(12) United States Patent
Liu et al.

(10) Patent No.: US 8,288,029 B2
(45) Date of Patent: Oct. 16, 2012

(54) BATTERY COVER ASSEMBLY FOR PORTABLE ELECTRONIC DEVICES

(75) Inventors: Jun-Fang Liu, Shenzhen (CN); Ming-Zhi Zheng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 321 days.

(21) Appl. No.: 12/826,713

(22) Filed: Jun. 30, 2010

(65) Prior Publication Data

US 2011/0159334 A1 Jun. 30, 2011

(30) Foreign Application Priority Data

Dec. 31, 2009 (CN) .......................... 2009 1 0312958

(51) Int. Cl.
*H01M 2/04* (2006.01)
*H01M 2/10* (2006.01)

(52) U.S. Cl. ...................................................... 429/100
(58) Field of Classification Search .................... 429/96, 429/97, 100

See application file for complete search history.

(56) References Cited

U.S. PATENT DOCUMENTS

| | | | |
|---|---|---|---|
| 5,607,792 A * | 3/1997 | Garcia et al. | 429/97 |
| 2010/0035137 A1* | 2/2010 | Zhang et al. | 429/100 |
| 2010/0055551 A1* | 3/2010 | Ng | 429/100 |
| 2010/0062323 A1* | 3/2010 | Dong et al. | 429/96 |
| 2010/0143778 A1* | 6/2010 | Huang | 429/100 |
| 2010/0167114 A1* | 7/2010 | Tang | 429/97 |
| 2011/0095547 A1* | 4/2011 | Liu et al. | 292/277 |

* cited by examiner

*Primary Examiner* — Robert B Davis
(74) *Attorney, Agent, or Firm* — Altis Law Group, Inc.

(57) ABSTRACT

A battery cover assembly is used for a portable electronic device. The battery cover assembly includes a base body, a battery cover, a latching member and an elastic rod. The battery cover forms two hooks. The latching member is slidably attached to the base body. The latching member defines two hook holes. The elastic rod is attached to the base body and provides an elastic force to the latching member.

20 Claims, 9 Drawing Sheets

BATTERY COVER ASSEMBLY FOR PORTABLE ELECTRONIC DEVICES

BACKGROUND

1. Technical Field

The present disclosure generally relates to battery cover assemblies and, particularly, to a battery cover assembly for use in a portable electronic device.

2. Description of Related Art

Batteries are widely used in portable electronic devices, such as personal digital assistants (PDAs), and mobile phones. Conventional batteries are removably installed in the electronic device, and battery covers are designed to connect to housings of the electronic devices to cover and protect the batteries. Batteries are replaced by opening the battery covers when, for example, the batteries are damaged and/or dead.

Although battery cover assemblies may be simple, engagement between the battery cover and the housing of the mobile phone can be too firm to be easily undone.

Therefore, there is room for improvement within the art.

BRIEF DESCRIPTION OF THE DRAWINGS

Many aspects of the battery cover assembly can be better understood with reference to the following drawings. The components in the drawings are not necessarily drawn to scale, the emphasis instead being placed upon clearly illustrating the principles of the battery cover assembly. Moreover, in the drawings, like reference numerals designate corresponding parts throughout the several views, in which.

DETAILED DESCRIPTION

Figure 1:
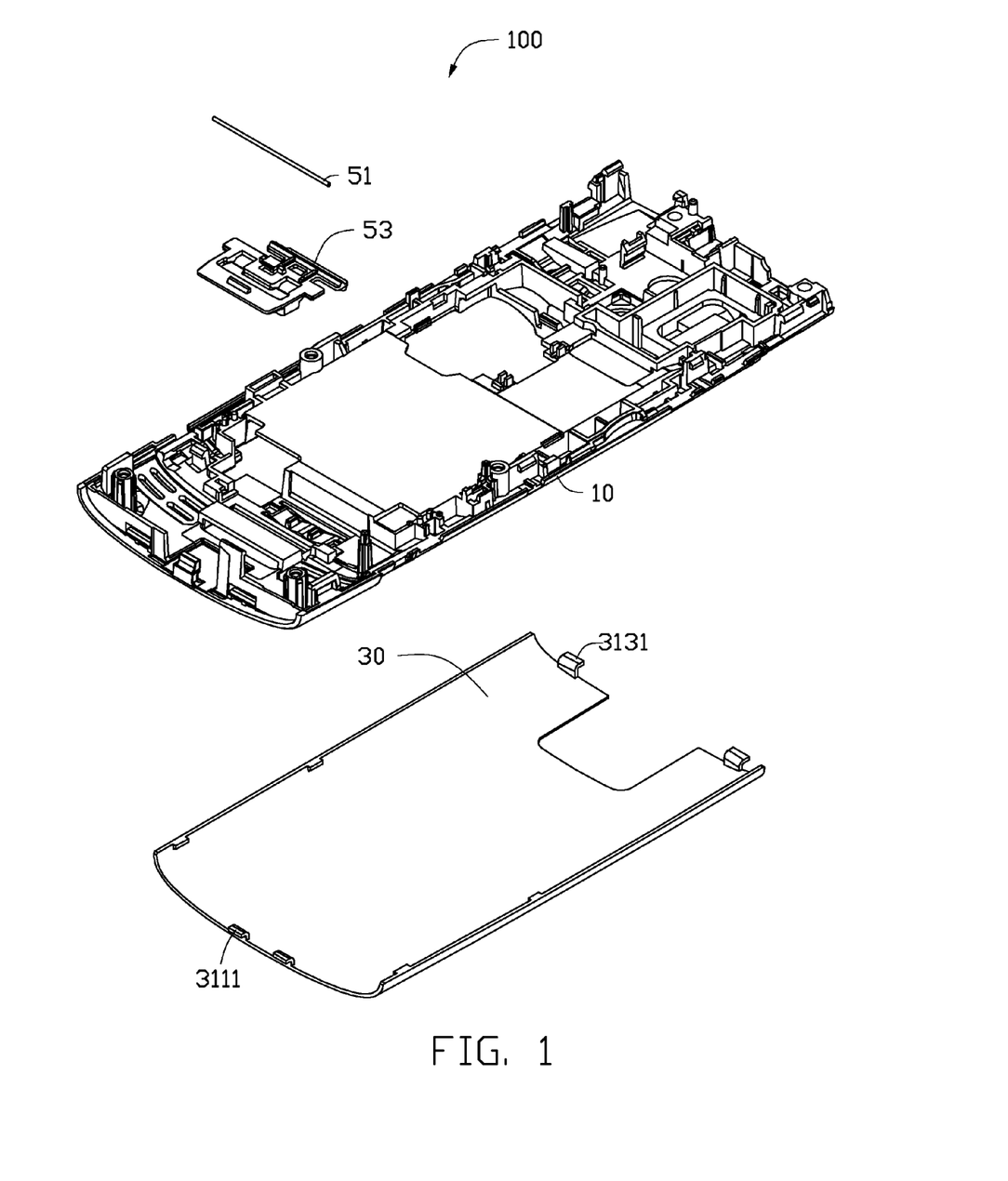
FIG. 1 is an exploded, isometric view of a portable electronic device employing a battery cover assembly in accordance with an exemplary embodiment.

FIG. 1 shows a portable electronic device 100, such as a mobile phone, having a battery cover assembly. The mobile phone 100 is an exemplary embodiment of a battery cover assembly. The battery cover assembly includes a base body 10, a battery cover 30, an elastic rod 51, and a latching member 53. The elastic rod 51 and the latching member 53 releasably latch the battery cover 30 to the base body 10.

The battery cover 30 has a shape corresponding to the base body 10 and is configured to be attached to the base body 10. Two hooks 3111 extend from one end of the battery cover 30, and two catches 3131 extend from another end of the battery cover 30.

Figure 2:
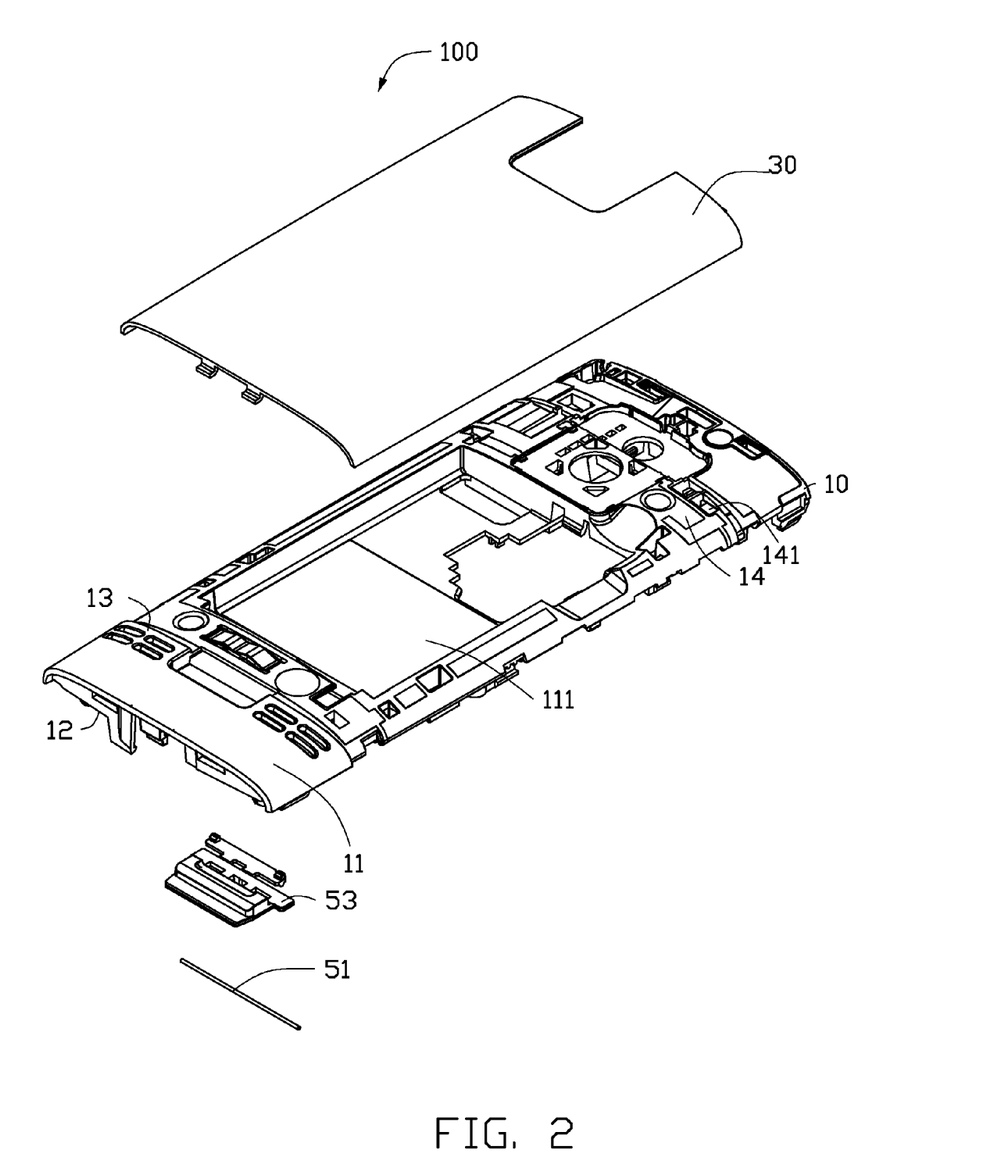
FIG. 2 is similar to FIG. 1, but shown from another aspect.

Referring to FIG. 2, the base body 10 includes a first surface 11 and an opposite second surface 12. The first surface 11 defines a cavity 111 for receiving a battery (not shown). The base body 10 includes a first end portion 13 and an opposite second end portion 14. The second end portion 14 defines two catch holes 141 for receiving the catches 3131.

Figure 3:
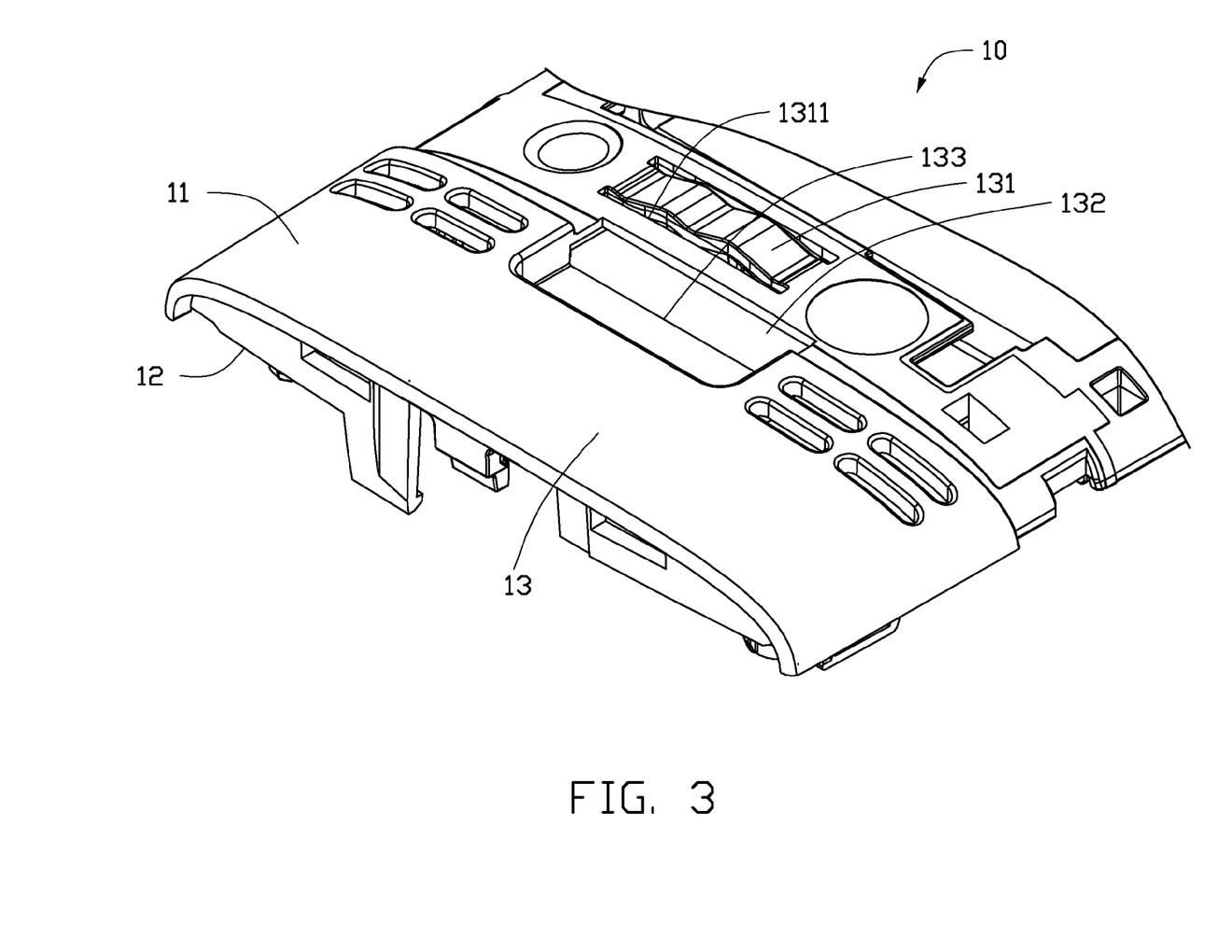
FIG. 3 is an enlarged view of one portion of the housing.
Figure 4:
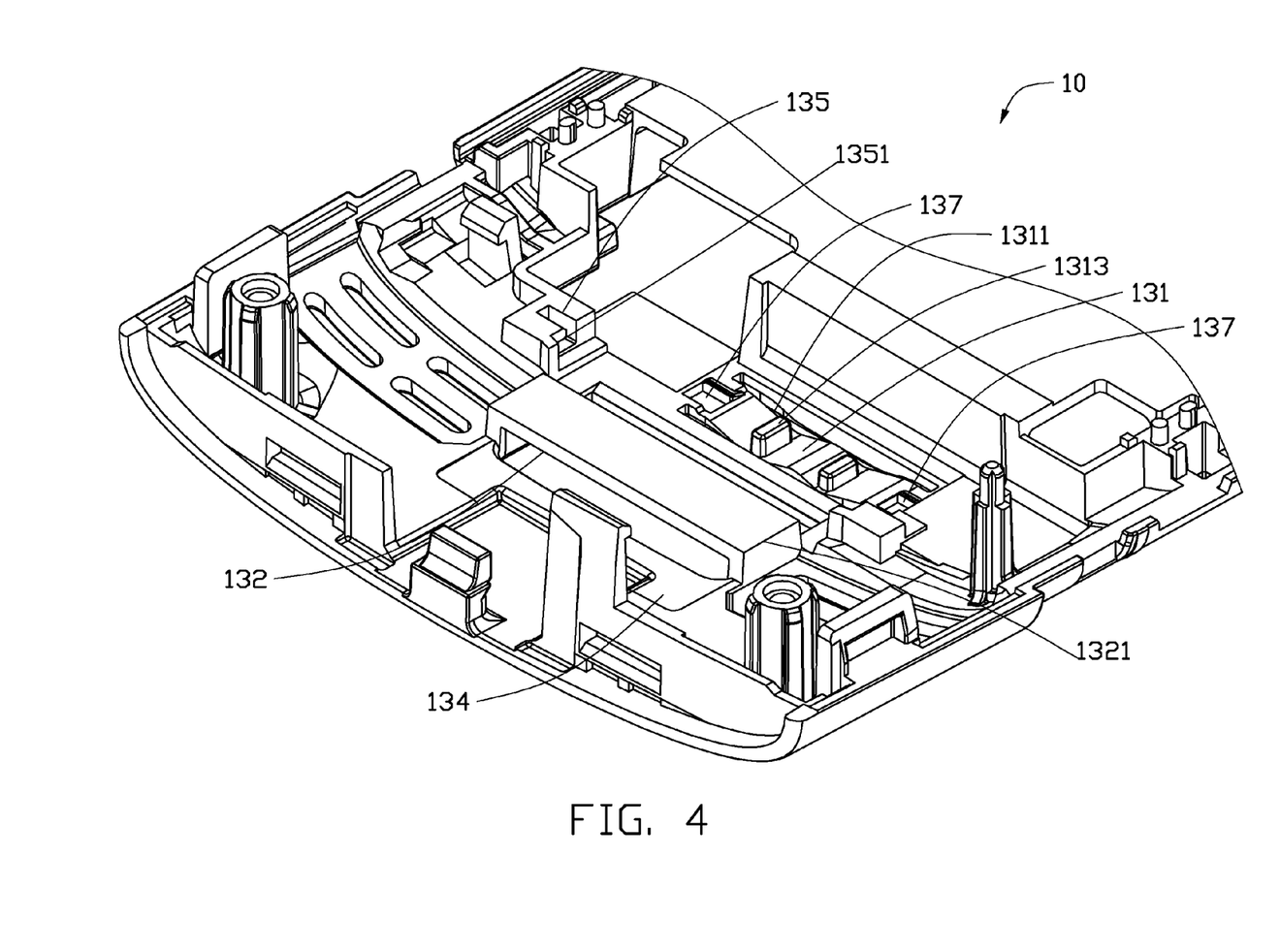
FIG. 4 is similar to FIG. 3, but shown from another aspect.

Referring to FIGS. 3 and 4, the first end portion 13 includes a pressed portion 131 and a receiving portion 133. The pressed portion 131 is substantially an elastic wave plate, and is formed adjacent to the cavity 111. A slit 1311 is defined in each of two sides of the pressed portion 131 to allow the pressed portion 131 to move downward when pressed. Two blocks 1313 are formed on the pressed portion 131 facing the second surface 12. A latching groove 137 is defined at each end of the pressed portion 131. The receiving portion 133 defines a through hole 132 and a receiving groove 134. The through hole 132 communicates with the first surface 11 and the second surface 12. The receiving groove 134 is defined in the second surface 12. A frame 1321 mounts at two sides of the through hole 132. Two positioning blocks 135 are formed at the sides of the through hole 132. Each positioning block 135 defines a slot 1351.

The elastic rod 51 passes through the latching member 53, and the ends of the elastic rod 51 are latched in the slots 1351 of the positioning blocks 135.

Figure 5:
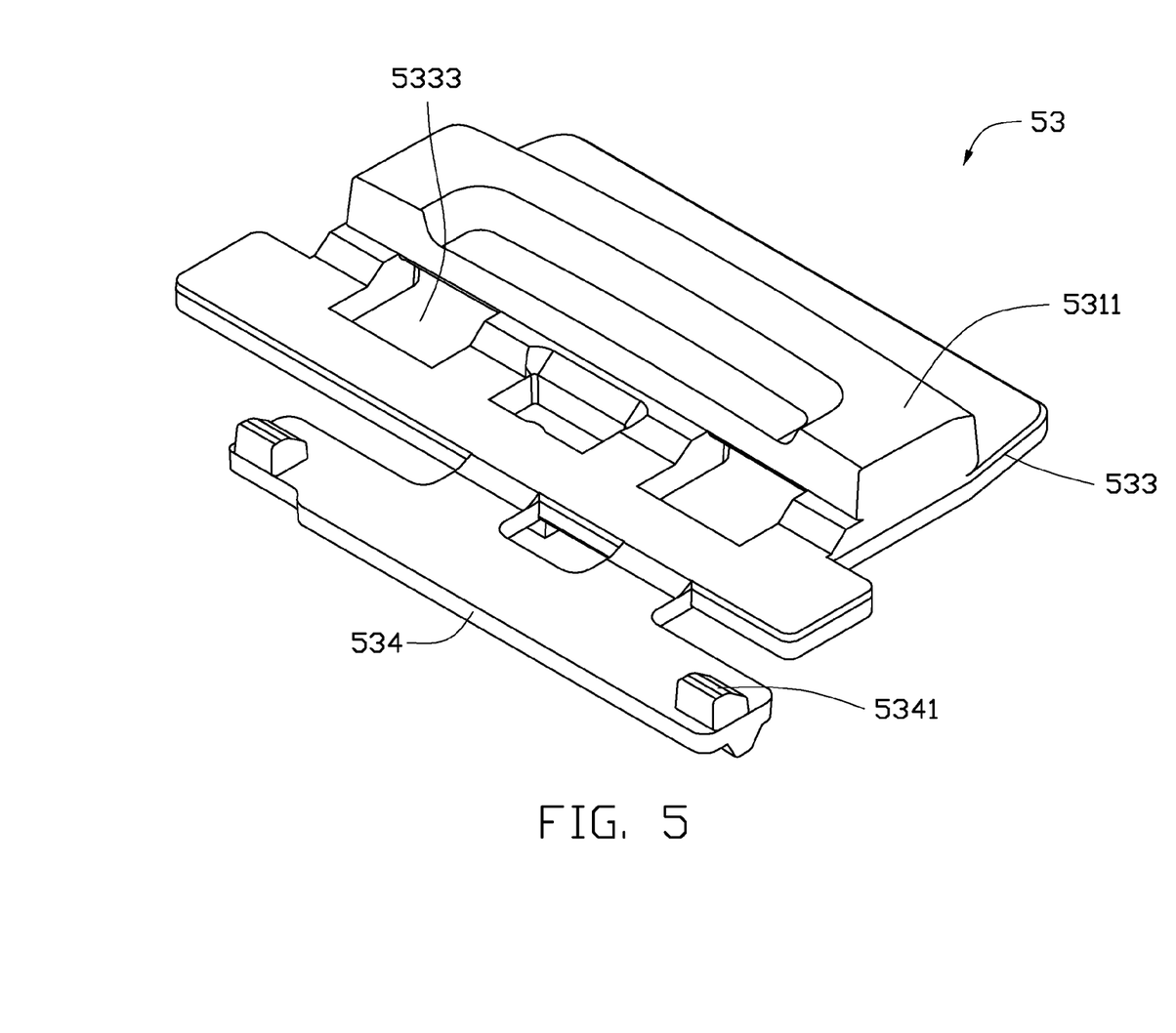
FIG. 5 is an enlarged view of a latching member.
Figure 6:
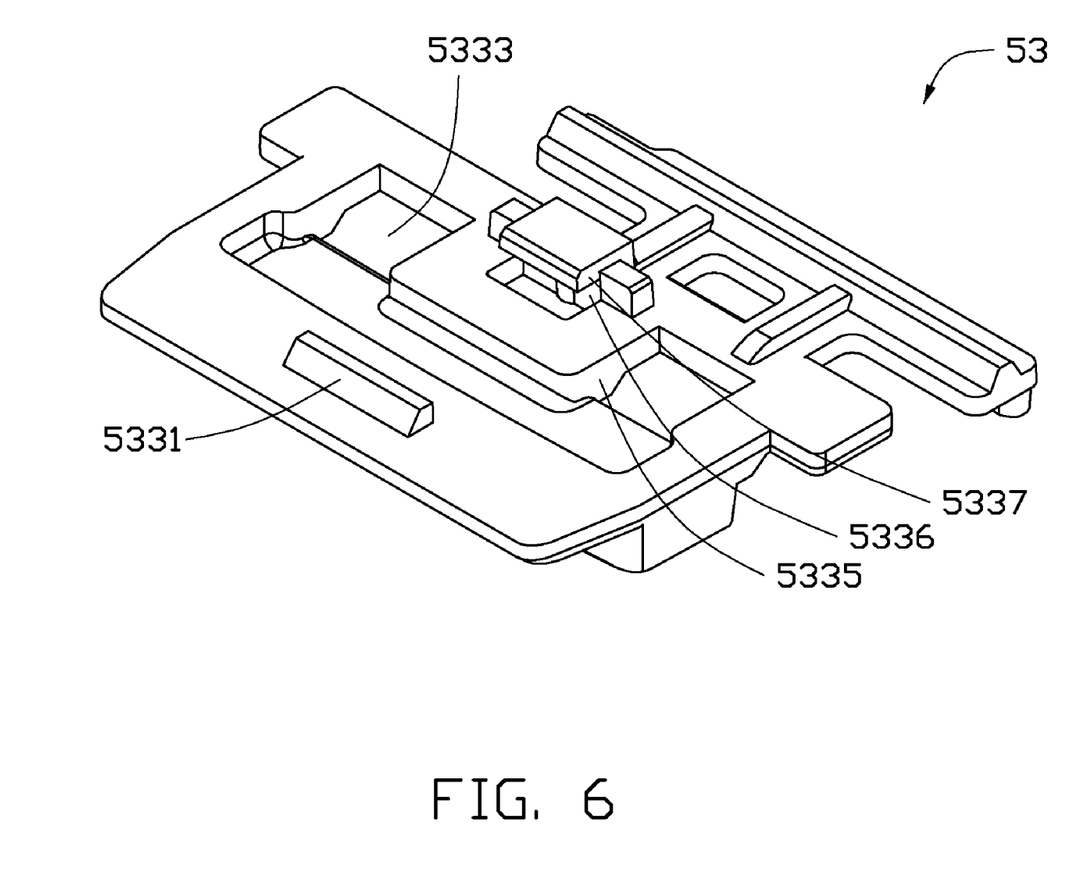
FIG. 6 is similar to FIG. 5, but shown from another aspect.

Referring to FIGS. 5 and 6, the latching member 53 is for unlocking or locking the battery cover 30 to the base body 10. The latching member 53 includes a base plate 533 and a resisting plate 534 integrally formed together. A button 5311 is formed at one side of the base plate 533. The base plate 533 defines two spaced hook holes 5333 adjacent to the button 5311 for latching with the hooks 3111. A support stage 5335 is formed between the hook holes 5333 one the other side of the base plate 533. An L-shape protrusion 5337 extends from the support stage 5335. A space 5336 is defined between the protrusion 5337 and the support stage 5335. The elastic rod 51 may be received in the space 5336. A stopper block 5331 is formed on the base plate 533 spaced away from the L-shape protrusion 5337. The resisting plate 534 extends from one side of the base plate 533. Two projections 5341 extend from the resisting plate 534 at the side of the button 5311.

Figure 7:
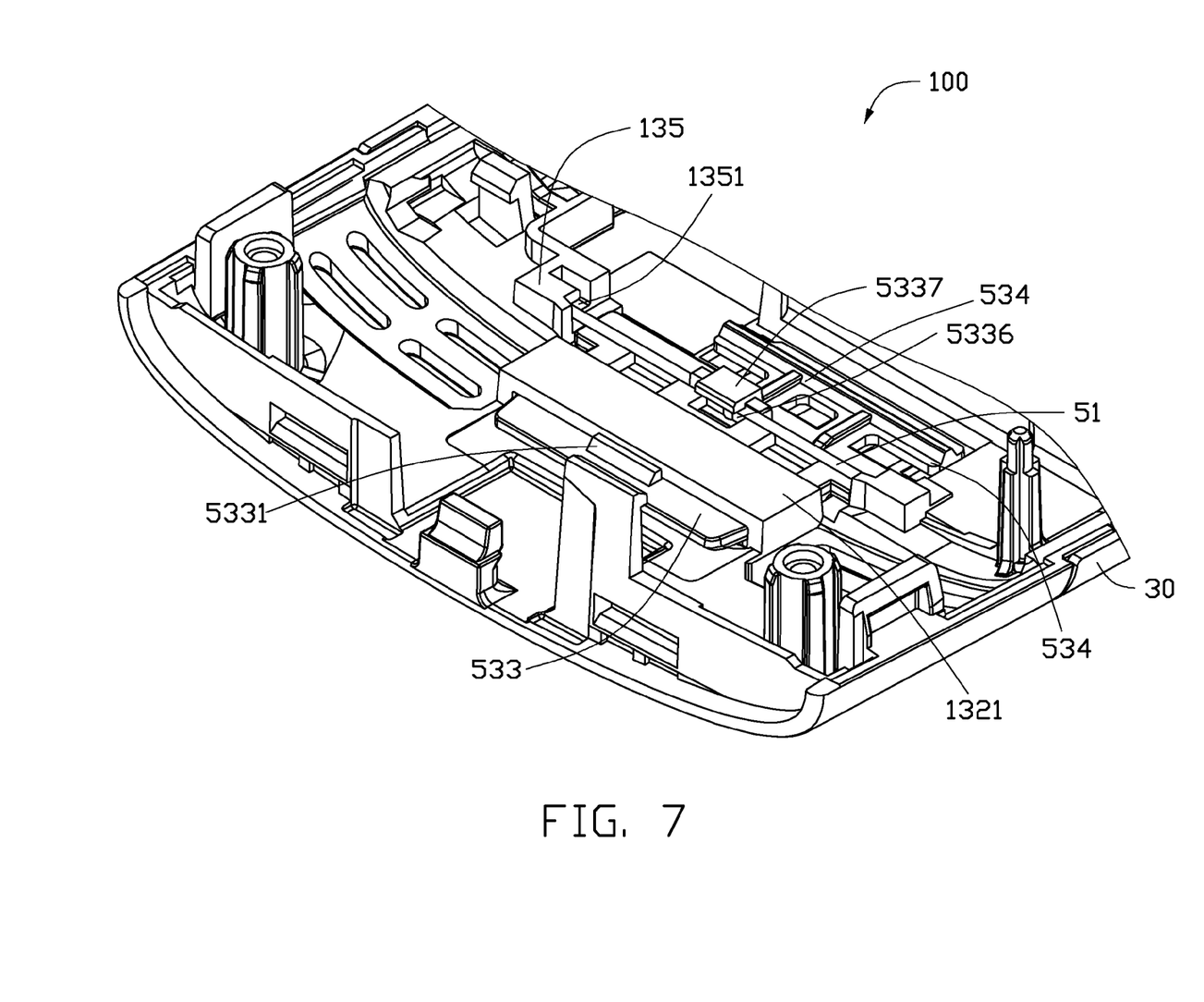
FIG. 7 is an assembly view of the portable electronic device.
Figure 8:
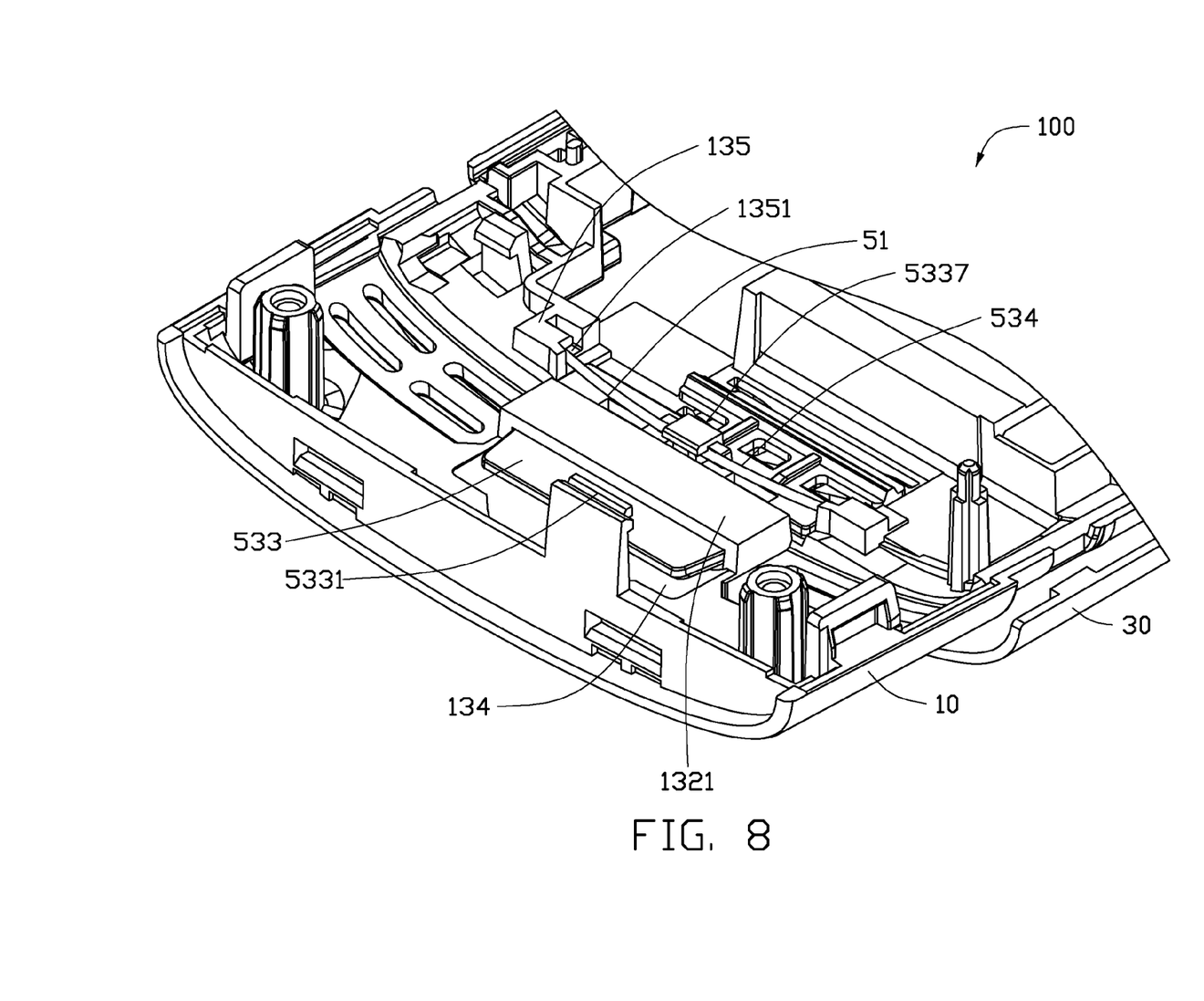
FIG. 8 is an assembly view showing an open state.

During assembly of the battery cover assembly, first, the base plate 533 is received in the receiving groove 134, and the button 5311 is exposed from the through hole 132. The resisting plate 534 abuts the pressed portion 131. Referring to FIG. 7, the frame 1321 prevents the base plate 533 from separating from the base body 10. Referring to FIG. 8, the elastic rod 51 is received in the space 5336, and two ends of the elastic rod 51 are latched in the slots 1351. The latching member 53 is moved toward the first end portion 13 to allow the projections 5341 to be received in the latching grooves 137. To the movement of the latching member 53 deforms the elastic rod 51, thereby providing an elastic force to the latching member 53. Thus, the latching member 53 is attached to the receiving portion 133. Then, the catches 3131 at one end of the battery cover 30 are inserted into the catch holes 141, and the other end of the battery cover 30 is pressed downward with external force until the other end of the battery cover 30 firstly contacts one side of the pressed portion 131, thereby the pressed portion 131 is forced to bend toward the second surface 12. Accordingly, the blocks 1313 at the other side of the pressed portion 131 push the latching member 53 to allow the projections 5341 to separate from the latching grooves 137. The latching member 53 is unlocked, and is moved under the force of the elastic rod 51 to allow the hooks 3111 to be latched in the hook holes 5333. Thus, the battery cover 30 is assembly in the base body 10.

When the latching member 53 is attached to the receiving portion 133, the position of the hook hole 5333 is spaced from the hooks 3111 of the battery cover 30 and cannot receive the hooks 3111 if the latching member 53 is kept there. When the battery cover 30 presses the pressed portion 131, the latching member 53 is unlocked and moves to allow the hook holes 5333 to receive the hooks 3111. Thus, the latching member 53 is controlled by the pressed portion 131 to automatically lock with the hooks 3111.

Figure 9:
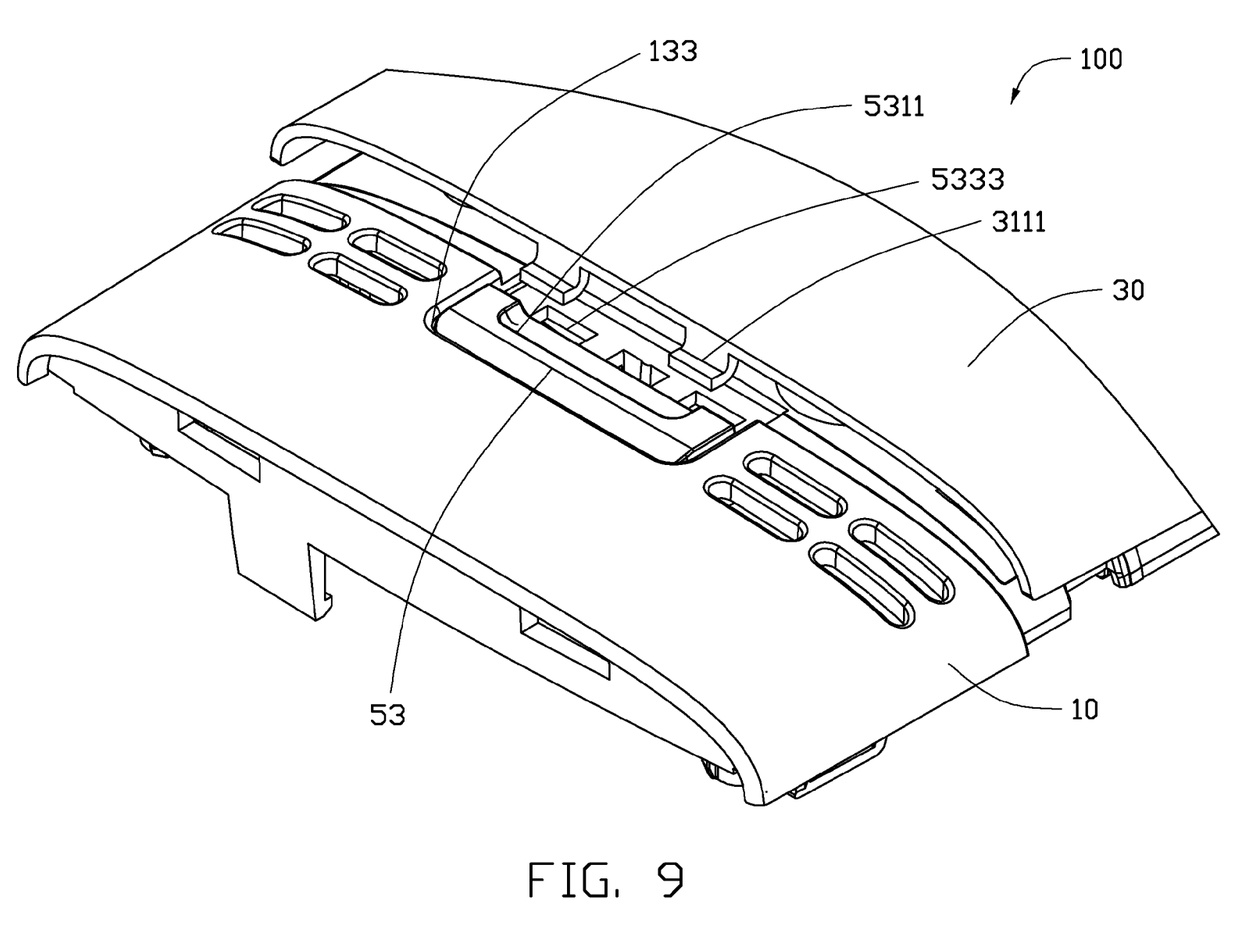
FIG. 9 is similar to FIG. 8, but shown from another aspect.

Referring to FIG. 9, when the battery cover 30 is to be opened, the button 5311 is pushed with an external force to move toward the first end portion 13 until the projections 5341 are forced to be received in the latching groove 137. The hooks 3111 can then be separated from the hook hole 5333. The pressed portion 131 automatically pushes out the battery cover 30. The battery cover 30 can then be removed.

As described above, the exemplary embodiment provides a battery cover assembly for portable electronic devices, such as mobile phones. The battery cover of the battery cover assembly can be easily opened and more user-friendly.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A battery cover assembly for a portable electronic device, the battery cover assembly comprising:
   a base body including a receiving portion, the receiving portion defining a through hole and a receiving groove;
   a battery cover forming two hooks;
   a latching member slidably attached to the receiving groove of the base body and exposed from the through hole, the latching member defining two hook holes; and
   an elastic rod attached to the base body and providing an elastic force to the latching member.

2. The battery cover assembly as claimed in claim 1, wherein a frame rides at two sides of the through hole to prevent the latching member from separating from the base body.

3. The battery cover assembly as claimed in claim 1, wherein the base body includes a pressed portion, the pressed portion is substantially an elastic wave plate.

4. The battery cover assembly as claimed in claim 3, wherein a slit is defined at each of two sides of the pressed portion to allow the pressed portion to move downward.

5. The battery cover assembly as claimed in claim 4, wherein two blocks are formed on the pressed portion, a latching groove is defined at each of two ends of the pressed portion.

6. The battery cover assembly as claimed in claim 1, wherein two positioning blocks are formed at two sides of the through hole, each positioning block defines a slot, and two ends of the elastic rod are latched in the slots.

7. The battery cover assembly as claimed in claim 1, wherein the latching member includes a base plate and a resisting plate integrally formed together, the base plate defines the hook holes, and a button is formed at one side of the base plate.

8. The battery cover assembly as claimed in claim 1, wherein a support stage is formed between the hook holes, an L-shape protrusion extends from the support stage, a space is defined between the support stage and the block, and the elastic rod is received in the space.

9. The battery cover assembly as claimed in claim 1, wherein the resisting plate extends from one side of the base plate, and two projections extend from the resisting plate at the side of the button.

10. A portable electronic device comprising:
    a base body forming a receiving portion and a pressed portion, a frame formed at one side of the receiving portion;
    a battery cover elastically abutting against the pressed portion, the battery cover forming a hook;
    a latching member slidably attached to the receiving portion and supported by the frame for preventing the latching member from separating from the base body in a vertical direction, the latching member including a base plate and a resisting plate integrally formed together, the base plate forming a stopper block and defining a hook hole, the stopper block abutting against the frame for preventing the base plate from separating from the base body in a horizontal direction;
    an elastic rod attached to the base body and providing an elastic force to the latching member; and
    wherein when the latching member is slid, the hook is separated from the hook hole to allow the battery cover to be automatically separated from the base body.

11. The portable electronic device as claimed in claim 10, wherein the receiving portion defines a through hole and a receiving groove, the latching member is received in the receiving groove, and is exposed from the through hole.

12. The portable electronic device as claimed in claim 10, wherein the pressed portion is substantially an elastic wave plate.

13. The portable electronic device as claimed in claim 12, wherein a slit is defined at each of two sides of the pressed portion to allow the pressed portion to move downward.

14. The portable electronic device as claimed in claim 10, wherein a button is formed at one side of the base plate.

15. The portable electronic device as claimed in claim 14, wherein a support stage is formed on the base plate, an L-shape protrusion extends from the support stage, a space is defined between the support stage and the block, and the elastic rod is received in the space.

16. The portable electronic device as claimed in claim 15, wherein the resisting plate extends from one side of the base plate, and two projections extend from the resisting plate at the side of the button.

17. A portable electronic device comprising:
    a base body forming a receiving portion and a pressed portion, the pressed portion being substantially an elastic wave plate;
    a battery cover elastically abutting against the pressed portion, the battery cover forming a hook;
    a latching member slidably attached to the receiving portion, the latching member defining a hook hole;
    an elastic rod attached to the base body and providing an elastic force to the latching member; and
    wherein when the latching member is slid, the hook is separated from the hook hole to allow the battery cover to be automatically separated from the base body.

18. The portable electronic device as claimed in claim 17, wherein a slit is defined at each of two sides of the pressed portion to allow the pressed portion to move downward.

19. The portable electronic device as claimed in claim 17, wherein the latching member includes a base plate and a resisting plate integrally formed together, and a button is formed at one side of the base plate, and two projections extend from the resisting plate at the side of the button.

20. The portable electronic device as claimed in claim 19, wherein a support stage is formed on the base plate, an L-shape protrusion extends from the support stage, a space is defined between the support stage and the block, and the elastic rod is received in the space.

* * * * *